United States Patent Office 2,775,584
Patented Dec. 25, 1956

2,775,584

PREPARATION OF ORGANIC ACID ESTERS OF CELLULOSE HAVING AN IMPROVED RESISTANCE TO DELUSTERING

Blanche B. White, Summit, Gregory M. Moelter, Basking Ridge, and Leonard J. Rosen, East Orange, N. J., assignors to Celanese Corporation of America, New York, N. Y., a corporation of Delaware No Drawing. Application November 16, 1951, Serial No. 256,811

10 Claims. (Cl. 260—230)

This invention relates to the preparation of organic acid esters of cellulose and relates more particularly to a novel process for the preparation of organic acid esters of cellulose having an improved resistance to delustering.

According to one process heretofore employed for the production of organic acid esters of cellulose, a cellulosic material, preferably after a suitable pretreatment, is esterified with a mixture containing an organic acid anhydride as the esterifying agent, an esterification catalyst and an organic acid as the solvent for the organic acid ester of cellulose being formed. Following the completion of the esterification, the organic acid ester of cellulose is hydrolyzed to impart the desired solubility characteristics thereto, and is then precipitated from solution in the form of a flake, stabilized if necessary, washed and finally dried. The organic acid ester of cellulose flake prepared in this manner may be employed for the production of yarns, filaments, fibers, fabrics, films and the like.

If no pigment is added to the organic acid ester of cellulose, the materials produced therefrom will exhibit a high luster. For commercial applications, these materials should retain their luster throughout all the treatments, such as washing at elevated temperatures, to which they are normally subjected both during their production and use. While the organic acid esters of cellulose prepared in the manner described above have a good resistance to delustering and are acceptable for commercial use, they still exhibit a definite amount of delustering when washed with water at elevated temperatures.

It is an important object of this invention to provide a process for the production of organic acid esters of cellulose having an improved resistance to delustering.

A further object of this invention is to provide an improved process for the production of organic acid esters of cellulose having an improved resistance to delustering by changing the nature of the salts present therein.

Other objects of this invention will be apparent from the following detailed description and claims.

We have now discovered that the resistance to delustering of organic acid ester of cellulose materials is dependent, in large part, upon the nature of the salts present therein. Specifically, it has been found that the organic acid ester of cellulose materials will tend to deluster if there are present therein salts that are capable of existing in two different degrees of hydration, i. e. both in the form of a hydrate having a relatively large number of moles of water per mole of salt and also in unhydrated form or in the form of a hydrate having a smaller number of moles of water per mole of salt, and if there is a relatively large change in the specific volume of the salts in passing from one to the other of these degrees of hydration. Apparently, when the organic acid ester of cellulose materials containing these salts are washed with water at elevated temperatures, the degree of hydration and the volume of the salts increases, displacing the organic acid ester of cellulose material next adjacent thereto. Then, when the said materials are dried, the degree of hydration and the volume of the salts decreases, but the organic acid ester of cellulose material will not return to its original position in contact with the salt crystals. As a result, the washing and drying of the organic acid ester of cellulose materials produces a large number of empty spaces or vacuoles therein which, because they differ in refractive index from the organic acid ester of cellulose material, will cause a scattering of light to take place and thereby reduce the luster of the organic acid ester of cellulose materials.

In general it has been found that organic acid ester of cellulose materials will exhibit an excessive tendency to deluster when they contain salts whose change in volume in passing from one degree of hydration to another exceeds about 0.60 cubic centimeters per gram of salt and is especially marked when this change in volume exceeds about 0.75 cubic centimeters per gram of salt (measured as the anhydrous salt). Among the salts whose change in volume in passing from one degree of hydration to another exceeds this value and which have been found by test to produce an excessive tendency to deluster when present in organic acid ester of cellulose materials are sodium sulfate which exhibits an increase in volume of 1.18 cc./gm. in passing from the anhydrous state to the hydrated state containing 10 moles of water per mole of salt; sodium phosphate which exhibits an increase in volume of 1.04 cc./gm. in passing from the anhydrous state to the hydrated state containing 12 moles of water per mole of salt; magnesium sulfate which exhibits an increase in volume of 0.87 cc./gm. in passing from the anhydrous state to the hydrated state containing 7 moles of water per mole of salt; and aluminum sulfate which exhibits an increase in volume of 0.78 cc./gm. in passing from the anhydrous state to the hydrated state containing 18 moles of water per mole of salt.

The salts present in the organic acid ester of cellulose materials may have been added thereto as catalysts during the pretreatment or esterification steps. Alternatively, when an acid esterification catalyst such as sulfuric acid is employed during the esterification, the salts may be formed when the catalyst is neutralized in whole or in part following the completion of the esterification as is the practice in certain processes for the production of organic acid esters of cellulose. In this way, when sulfuric acid is employed as the esterification catalyst, magnesium sulfate and sodium sulfate may be formed in the organic acid ester of cellulose materials by neutralizing the catalyst with a magnesium or sodium salt, respectively. Similarly, the corresponding phosphate salts may be formed in the organic acid ester of cellulose materials when phosphoric acid is employed as the esterification catalyst. Although the major portion of the salt is removed from the organic acid ester of cellulose materials during the washing that these materials normally receive, the complete removal of the salt is not economically feasible on a commercial basis and a sufficient quantity of the salt remains in the said materials to impart thereto an excessive tendency toward delustering.

It has now been found that it is possible markedly to reduce the tendency toward delustering of the organic acid ester of cellulose materials containing salts of the character specified above by replacing the said salts with salts which will show a minimum change in volume during any treatments that the said organic acid ester of cellulose materials receive during their production and use. Specifically, it has been found that the tendency of the organic acid ester of cellulose materials to deluster may be markedly reduced by converting the salts present therein to salts whose change in specific volume is less than about 0.6 cc./gm. in passing from one degree of hydration to another, assuming that the salt may exist in two degrees of hydration. Among the salts whose change in volume in passing from one degree of hydration to another lies below this value and which have been found by test not to produce an excessive tendency to deluster when present in organic acid ester of cellulose materials are calcium sulfate which exhibits an increase in volume of only 0.21 cc./gm. in passing from the anhydrous state to the hydrated state containing 2 moles of water per mole of salt; magnesium acetate which exhibits an increase in volume of only 0.27 cc./gm. in passing from the anhydrous state to the hydrated state containing 4 moles of water per mole of salt; and sodium acetate which exhibits an increase in volume of only 0.49 cc./gm. in passing from the anhydrous state to the hydrated state containing 3 moles of water per mole of salt.

A simple way of achieving the desired conversion of the salt in the organic acid ester of cellulose materials is to add to the wash water employed for washing the organic acid ester of cellulose flake a substance which will react with the undesired salt present therein with the production of salts of the desired type. Advantageously, this may be effected by adding to the wash water a salt which will react with the salt present in the organic acid ester of cellulose material and by double decomposition or metathesis produce salts of the desired type. To insure that the reaction between the salts will take place at least one of the salts produced by the reaction should be relatively insoluble as compared with the salts that enter into the reaction. Salts that may be added to the wash water to effect the desired conversion include, for example, soluble calcium salts, such as calcium acetate, calcium propionate and calcium bicarbonate, as well as barium acetate and barium bicarbonate. In carrying out the present invention, there is advantageously employed wash water having present therein from about 20 to 75 parts per million of the salt, calculated as calcium carbonate. The temperature of the wash water is not critical and may range between about 25 and 90° C. However, when the wash water contains above about 65 parts per million of salt, calculated as calcium carbonate, it is preferred to maintain the temperature of the wash water at less than about 65° C. since the improvement in resistance to delustering is less marked at higher temperatures.

The process of the present invention will now be described specifically in connection with the production of cellulose acetate which is commercially the most important organic acid ester of cellulose at the present time. It is to be understood, however, that it may also be employed for the production of other organic acid esters of cellulose, such as for example, cellulose propionate, cellulose butyrate, cellulose acetate propionate and cellulose acetate butyrate by substituting one of these other esters for the cellulose acetate.

*Example I*

A thoroughly washed cellulose acetate having an acetyl value of 54.0 percent, calculated as acetic acid, and containing 435 parts per million of magnesium sulfate, is washed three times for twenty minute periods with twelve times its weight of water maintained at 25° C. and containing 20 parts per million of calcium acetate, calculated as calcium carbonate. Following the third washing, the cellulose acetate is dried. During the process, the calcium acetate reacts with the magnesium sulfate producing calcium sulfate and magnesium acetate. The cellulose acetate which has been thus washed with the water containing calcium acetate is much more resistant to delustering than the original cellulose acetate.

*Example II*

A thoroughly washed cellulose acetate having an acetyl value of 54.0 percent, calculated as acetic acid, and containing 435 parts per million of magnesium sulfate, is washed three times for twenty minute periods with twelve times its weight of water maintained at 25° C. and containing 60 parts per million of calcium bicarbonate, calculated as calcium carbonate. Following the third washing, the cellulose acetate is dried. During the process, the calcium bicarbonate reacts with the magnesium sulfate producing calcium sulfate and magnesium bicarbonate. The cellulose acetate which has been thus washed with the water containing the calcium bicarbonate is much more resistant to delustering than the original cellulose acetate.

*Example III*

A freshly precipitated cellulose acetate flake wet with dilute acetic acid and containing several thousand parts per million of magnesium sulfate is washed counter-current with water maintained at 55° C. and containing 60 parts per million of calcium bicarbonate, calculated as calcium carbonate. After washing for 1.5 hours, the cellulose acetate flake is free from acetic acid and substantially free from magnesium sulfate. On drying, the cellulose acetate shows an improved resistance to delustering in the form of film or fibers as compared with the same cellulose acetate which has been washed with water free from calcium salts.

It is to be understood that the foregoing detailed description is given merely by way of illustration and that many variations may be made therein without departing from the spirit of our invention.

Having described our invention, what we desire to secure by Letters Patent is:

1. In the process for manufacturing organic acid esters of cellulose suitable for the production of filaments and films, wherein the cellulose is esterified to form a solution of said cellulose ester and said cellulose ester is precipitated from said soution, washed and dried, and in which said precipitated cellulose ester contains salts that are capable for existing in two different degrees of hydration and which exhibit a change in specific volume of more than about 0.6 cubic centimeters per gram in passing from one degree of hydration to the other degree of hydration, the improvement which comprises carrying out the washing of said precipitated cellulose ester with a water solution of a salt, selected from the group consisting of soluble calcium and barium salts, that will react with said aforementioned salts by metathesis to produce salts which exhibit a change in specific volume of less than about 0.6 cubic centimenters per gram in passing from one degree of hydration to another degree of hydration, at least one of the salts produced having a lower solubility than the salts present in the organic acid esters of cellulose and in the wash water and then drying said cellulose ester directly after said washing, said improvement resulting in an increase in the resistance to delustering of said cellulose ester when in the form of a film or filament.

2. In the process for manufacturing organic acid esters of cellulose suitable for the production of filaments and films, wherein the cellulose is esterified to form a solution of said cellulose ester and said cellulose ester is precipitated from said solution, washed and dried, and in which said precipitated cellulose ester contains salts that are capable for existing in two different degrees of hydration and which exhibit a change in specific volume of more than about 0.75 cubic centimeters per gram in passing from one degree of hydration to the other degree of hydration, the improvement which comprises imparting to the product an increased resistance to delustering by carrying out the washing of said precipitated cellulose ester with a water solution of a salt, selected from the group consisting of soluble calcium and barium salts, that will react with said aforementioned salts by metathesis to produce salts which exhibit a change in specific volume of less than about 0.6 cubic centimeters per gram in passing from one degree of hydration to another degree of hydration, at least one of the salts produced having a lower solubility than the salts present in the organic acid esters of cellulose and in the wash water, said water solution containing about 20 to 75 parts per million of said calcium or barium salt, calculated as calcium carbonate.

3. Process as set forth in claim 2 in which said cellulose ester is cellulose acetate.

4. Process as set forth in claim 2 in which said cellulose acetate has an acetyl value of 54%, calculated as acetic acid, and contains magnesium sulfate.

5. Process as set forth in claim 1 in which said cellulose ester is cellulose acetate.

6. Process as set forth in claim 1 in which said solution contains about 20 to 75 parts per million of calcium acetate, calculated as calcium carbonate.

7. Process as set forth in claim 1 in which said cellulose acetate contains magnesium sulfate.

8. Process as set forth in claim 7 in which said cellulose acetate has an acetyl content of 54%, calculated as acetic acid.

9. Process as set forth in claim 8 in which the salt in said solution is selected from the group consisting of calcium acetate, calcium propionate, calcium bicarbonate, barium acetate and barium bicarbonate, and is present in amount of 20 to 75 parts per million, calculated as calcium carbonate, the temperature of said solution being about 25 to 65° C.

10. In the process for manufacturing organic acid esters of cellulose suitable for the production of filaments and films, wherein the cellulose is esterified to form a solution of said cellulose ester and said cellulose ester is precipitated from said solution, washed and dried, and in which said precipitated cellulose ester contains magnesium sulfate, the improvement which comprises carrying out the washing of said precipitated cellulose ester with a water solution of a salt, selected from the group consisting of soluble calcium and barium salts, that will react with said aforementioned salts by metathesis to produce salts which exhibit a change in specific volume of less than about 0.6 cubic centimeters per gram in passing from one degree of hydration to another degree of hydration, at least one of the salts produced having a lower solubility than the salts present in the organic acid esters of cellulose and in the wash water, said improvement resulting in an increase in the resistance to delustering of said cellulose ester when formed into a film or filament.

References Cited in the file of this patent

UNITED STATES PATENTS

| | | |
|---|---|---|
| 1,740,889 | Dreyfus et al. | Dec. 24, 1929 |
| 1,758,553 | Bassett et al. | May 13, 1930 |
| 1,765,581 | Hall | June 24, 1930 |
| 1,808,061 | Palmer et al. | June 2, 1931 |
| 1,939,261 | Hall | Dec. 12, 1933 |
| 2,002,083 | Dreyfus | May 21, 1935 |
| 2,073,853 | Schulze | Mar. 16, 1937 |
| 2,244,295 | Heath et al. | June 3, 1941 |
| 2,360,239 | Kirton et al. | Oct. 10, 1944 |
| 2,395,421 | Wilson | Feb. 26, 1946 |